(12) United States Patent
Masen et al.

(10) Patent No.: US 10,302,204 B2
(45) Date of Patent: May 28, 2019

(54) MULTIFUNCTION VALVE

(71) Applicant: Maxitrol Company, Southfield, MI (US)

(72) Inventors: Mark Geoffrey Masen, Leonard, MI (US); Jason Sagovac, Dearborn Heights, MI (US)

(73) Assignee: Maxitrol Company, Southfield, MI (US)

( * ) Notice: Subject to any disclaimer, the term of this patent is extended or adjusted under 35 U.S.C. 154(b) by 34 days.

(21) Appl. No.: 15/414,797

(22) Filed: Jan. 25, 2017

(65) Prior Publication Data

US 2017/0219103 A1    Aug. 3, 2017

Related U.S. Application Data

(60) Provisional application No. 62/288,620, filed on Jan. 29, 2016.

(51) Int. Cl.
*F16K 5/04* (2006.01)
*F16K 5/10* (2006.01)

(52) U.S. Cl.
CPC .......... *F16K 5/0407* (2013.01); *F16K 5/0442* (2013.01); *F16K 5/103* (2013.01)

(58) Field of Classification Search
CPC ........ F16K 5/0407; F16K 5/0442; F16K 5/10; F16K 5/103; F16K 5/181
USPC .............. 251/209, 205, 208, 309, 311, 312; 137/625.17
See application file for complete search history.

(56) References Cited

U.S. PATENT DOCUMENTS

| | | | | |
|---|---|---|---|---|
| 4,587,990 A | * | 5/1986 | Pennell | F16K 5/0636 137/454.2 |
| 2005/0012061 A1 | * | 1/2005 | Faye | F16K 5/0235 251/129.11 |
| 2010/0213400 A1 | * | 8/2010 | Yli-Koski | F16K 5/184 251/310 |

FOREIGN PATENT DOCUMENTS

| | | | | |
|---|---|---|---|---|
| FR | 2125709 A5 | * | 9/1972 | F16K 5/0407 |
| GB | 1215700 A | * | 12/1970 | F16K 5/0235 |
| WO | WO 2009048565 A1 | * | 4/2009 | F16K 5/0407 |

OTHER PUBLICATIONS

Translation of FR 2125709.*

* cited by examiner

*Primary Examiner* — Kevin F Murphy
*Assistant Examiner* — Kelsey E Cary
(74) *Attorney, Agent, or Firm* — Howard & Howard Attorneys PLLC (57) ABSTRACT

A multifunction valve includes a valve body defining an inlet, and outlet and an interior chamber. A flow control gate is disposed within the interior chamber and is rotatable through an arcuate range of positions relative to the outlet providing a high level of precision control of a fluid flow rate through the multifunction valve. A method of modulating a fluid flow rate includes directing fluid flow through a multifunction valve from an inlet to an outlet, the multifunction valve including a flow control gate, adjusting the flow rate through the multifunction valve by rotating a control shaft to position the flow control gate to variably occlude the outlet of the fluid control valve.

20 Claims, 6 Drawing Sheets

MULTIFUNCTION VALVE

RELATED APPLICATIONS

This application claims priority to and the benefit of U.S. Provisional Patent Application No. 62/288,620, filed on Jan. 29, 2016, the entire contents of which are hereby incorporated by reference.

BACKGROUND OF THE INVENTION

1. Field of the Invention

The present invention relates, generally, to fluid flow control and, more specifically, to a multifunction valve.

2. Description of the Related Art

Fluid control systems use a variety of valve types to turn fluid flow on and off, and also to modulate the flow rate through a fluid circuit. Conventional control systems may include valves having complex mechanisms including many components and complicated assembly. These valves may suffer from a lack of fine precision control, and require a larger volume within the fluid circuit.

There remains a need for improved valves for use in fluid control systems that have a simple, compact design for a given maximum flow rate (flow rate of gas at which a reasonable drop is pressure is observed), providing easy assembly and a high precision control of flow rate. A valve which causes the least amount of pressure drop at a given flow rate can be sold to a wider range of applications, or specifically, can be used where supply pressures are lower or where packaging concerns can be overcome.

SUMMARY OF THE INVENTION

The present disclosure overcomes the disadvantages in the related art in providing a multi-function valve simple in design and assembly, compact in size, and precise in flow rate control.

In this way, a multi-function valve includes a valve body defining an inlet and an outlet, and a flow control gate disposed between the inlet and the outlet. The valve body may define an upper inlet branch and a lower inlet branch, and an interior chamber extending between the upper and lower inlet branches. The valve may also include a control shaft disposed within the interior chamber supporting the flow control gate. A radiused feature at the inlet and outlet of the valve body may provide an increased surface area at an interface with other fluid circuit components.

Also disclosed herein is an improved method of fluid control. The method includes the steps of, first, directing fluid flow through a multifunction valve from an inlet to an outlet, the multifunction valve including a flow control gate, the flow control gate supported on a control shaft in an interior chamber of a valve body; and, second, adjusting the flow rate through the fluid control valve by causing a rotation of the control shaft which adjusts the position of the flow control gate to variably occlude the outlet of the multifunction valve.

Figure 1:
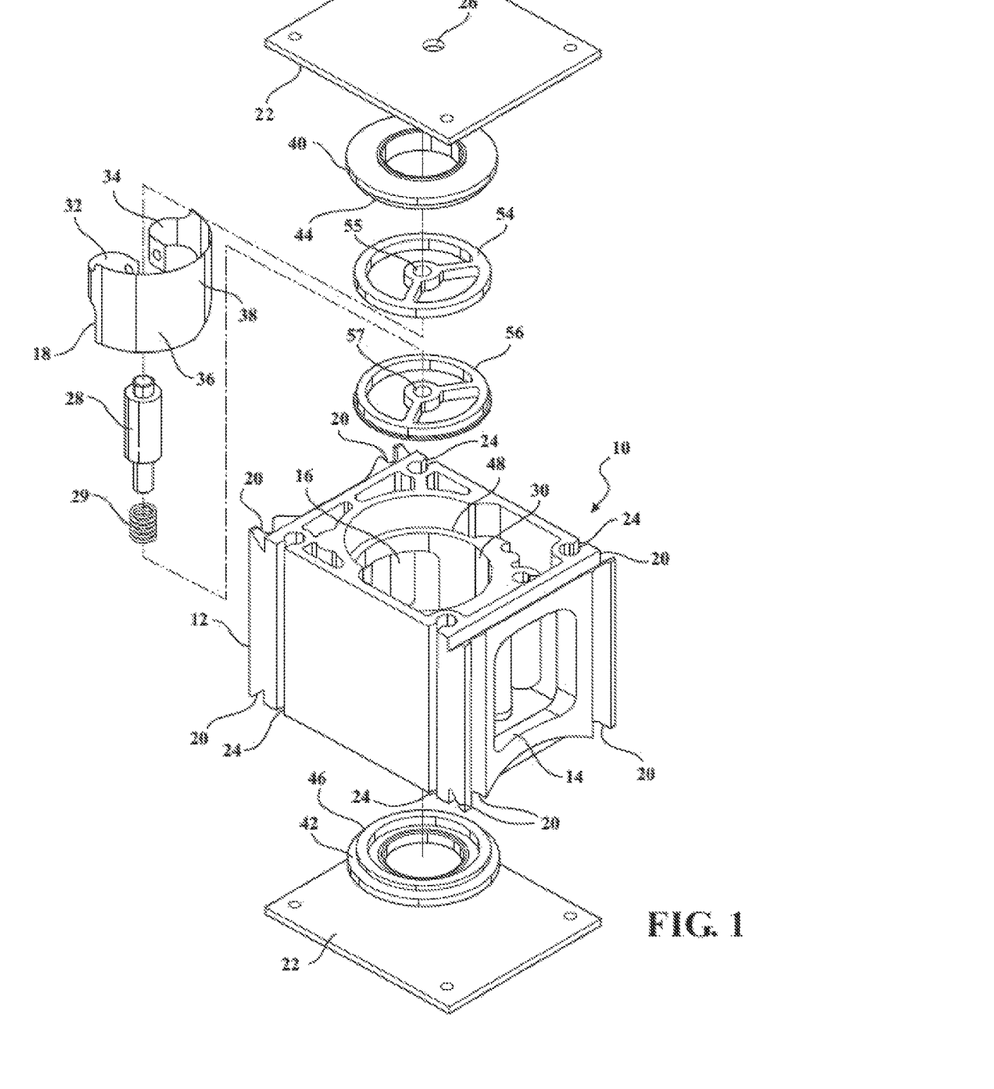
FIG. 1 shows an exemplary embodiment of a multifunction valve according to the present disclosure.

The radiused inlet and outlet are done also to increase open area for a given cross-section. When a filter screen is used on the design of the present disclosure, it will have more open area than a flat opening and therefore be less restrictive to the fluid flow through the filter (FIG. 1 at 14).

BRIEF DESCRIPTION OF THE DRAWINGS

Other objects, includes, and advantages of the present invention will be readily appreciated as the same becomes better understood after reading the subsequent description taken in connection with the accompanying drawings, wherein.

DETAILED DESCRIPTION OF THE INVENTION

With reference now to the drawings, FIG. 1 shows an exemplary embodiment of a multifunction valve 10 according to the present disclosure, shown in an exploded view. The multifunction valve 10 includes a valve body 12 that can be installed into a fluid circuit to provide flow control. The valve body 12 facilitates fluid flow from an inlet 14 to an outlet 16. The rate of fluid flow through the valve body is modulated by a flow control gate 18 disposed in the valve body 10 and in the fluid flow pathway between the inlet 14 and the outlet 16.

The valve body 12 defines the structure of the multifunction valve, providing an enclosure to the fluid flow pathway secure against fluid leakage and enabling the multifunction valve to be integrated into a fluid circuit. The valve body 12 may be formed from a variety of materials appropriate to the intended function of the multifunction valve, including consideration of the choice of fluid media to be communicated and the operating pressures and velocity for the fluid flow. For example, a high strength material, such as metal, may be selected to form the valve body 12 for the communication of high pressure fluids. The material of the valve body 12, or other components of the multifunction valve 10, may optionally be surface treated to accommodate the communication of the fluid. For example, a surface treatment may be applied to a metal valve body for the communication of a corrosive fluid, or operation in a corrosive environment. Alternatively, the valve body 12 may be formed of a ceramic material, a plastic material, a composite material or other material known in the art to be suitable for constructing valve bodies.

The valve body 12 is formed through conventional fabrication processes appropriate to the material selected to form the valve body 12. For example, a metal valve body 12 may be formed through a process of casting, forging, or machining as appropriate to create the features of the valve body 12. The valve body 12 may be extruded and then machined as needed. Extrusion can provide a capital cost reduction over cast tooling. Additionally, extrusion may avoid common pitfalls of casting complex bodies, such as:

porosity, voids, flash and cold shot. Alternatively, a plastic valve body may be formed through a molding process or a deposition process.

The valve body 12 may be provided with attachment features 20 that can facilitate the mechanical retention of valve body 12 to other components in a fluid circuit (not shown). Although depicted with a series of parallel and perpendicular V-shaped and semi-circular channels, the valve body 12 may be modified to incorporate any of a variety of attachments features 20 known in the art. Alternatively, the valve body may exclude attachment features 22 and may be secured to the fluid circuit through other means, such as: welding, brazing, soldering or the like. The appropriate attachment features or securement to incorporate the valve body to the fluid circuit is selected according to knowledge and skill in the art based on the material and construction of the valve body 12, the material of the fluid circuit components, as well as the fluid to be communicated and the operating pressure and flow rate of that fluid. The valve body 12 may also include other advantageous features to integrate with other components in a fluid circuit. Contoured exterior surfaces at the inlet 14 and the 16 maybe radiused, or curved, to increase the overall surface area at the interface between the valve by 12 and another component. When the multifunction valve 10 is used in conjunction with a filter screen at the inlet 14 or outlet 16, this allows the surface area of the filter to be increased, thus improving filter performance and longevity, without requiring an increase in total cross-sectional area at the interface with the multifunction valve.

The multifunction valve 10 also includes cover plates 22 that are secured to the valve body 12 to enclose the fluid flow pathway against communication of the fluid media outside the multifunction valve 10. The cover plates 22 may be secured to the valve body 12 through conventional means known in the art. For example, as shown in FIG. 1, cover plates 22 may be secured against the top and bottom surfaces (as depicted) of the valve body 12. Bolts or other threaded fasteners (not shown) may be provided to extend through the channels 24 and secure the cover plates 22 to the valve body 12. Additionally, gaskets, adhesives, or other filling materials (not shown) may be provided between the cover plates 22 and the top and bottom surface of the valve body 12 to ensure a fluid-tight seal. The selection of cover plate securement is determined by those of skill in the art based on the material of the valve body as well as the fluid to be communicated and the operating pressure and flow rate of that fluid. As will be described in further detail below, one or both of the cover plates 22 may be provided with an aperture 26 for the passage of a control shaft 28.

Within the valve body 12, the flow control gate 18 is provided to modulate the fluid flow rate through the multifunction valve 10. The flow control gate 18 is disposed within an interior chamber 30 of the valve body 12. The interior chamber 30 is depicted in FIG. 1 as a generally cylindrical volume centrally disposed within the valve body 12, although alternative structures are possible without departing from the scope of the present disclosure. The flow control gate 18 is supported within the valve body 18 by a control shaft 28.

Figure 3A:
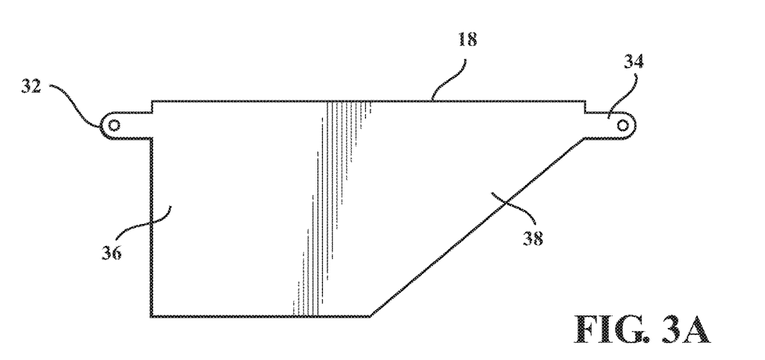
FIGS. 3A-3C shows multiple embodiments of a flow control gate according to the present disclosure.

As indicated in FIG. 1 and shown in more detail in FIG. 3A. The flow control gate 18 can be understood to comprise a plurality of sections. Two end sections 32, 34 disposed at opposite ends of the flow control gate 18 extend as tabs that can be secured to the control shaft 28. A third section 36 of the flow control gate provides full occlusion of the outlet 16 of the valve body 12. The full occlusion section 36 of the flow control gate 18, when disposed adjacent to the outlet 16 completely covers the outlet 16 thereby preventing fluid from flowing through the multifunction valve 10. A fourth section of the flow control gate 18 is a partial occlusion section 38. The partial occlusion section 38 provides a variable amount of obstruction to the outlet 16 to reduce the flow rate through the multifunction valve 10 from a maximum, unobstructed, fluid flowrate to a terminated, fully-obstructed flow.

In the exemplary embodiment, the flow control gate 18 is formed of a resilient material from a flat stock, such as a planar plastic sheet. In the alternative, the flow control gate may be formed of a metal, polymer, or other suitable material. In curving the flow control gate 18 to correspond to the surface of the interior chamber 30 of the valve body 12, the tabs 32 and 34 can be secured to the control shaft 28 with a pin 78, spring clip, mounting block 79, or other mechanical means conventional in the art so that as the control shaft 28 is rotated, a corresponding rotation of the flow control gate 18 is achieved. In the embodiment depicted in FIG. 1, the natural resiliency of the material, in the curved configuration shown, urges the flow control gate 18 against the surface of the interior chamber 30.

The flow control gate 18 is further secured within the interior chamber against axial displacement by upper and lower retaining plates 40 and 42. The upper and lower retaining plates 40 and 42 are annular plates configured to secure to the valve body 12, retaining the control shaft 28 and flow control gate 18 in place within the interior chamber 30. In the exemplary embodiment, the upper and lower retaining plates 40 and 42 include threaded portions 44 and 46. These threaded portions 44 and 46 allow the upper and lower retaining plates 40 and 42 to be threaded into engagement with corresponding threaded portions on the valve body 12.

The upper and lower retaining plates 40 and 42 may be formed of a suitable material and by conventional means consistent with the selection of material for the valve body 12 and the intended application of the multifunction valve 10. The upper and lower retaining plates 40 and 42 may be formed of the same materials as the valve body 12, or alternatively may be formed of a different material. Upper and lower gaskets 50 and 52, shown in FIG. 2, may also be provided at the base of the threaded portions 44 and 46 for ensuring a fluid tight seal between the upper and lower retaining plates 40 and 42 once installed. Upper and lower gaskets 50 and 52 may be provided in the shape of a torus, such as an O-ring, as depicted, or any other suitable gasket or mechanical seal.

Further provided within the inner chamber 30 are upper and lower guide plates 54 and 56. The upper and lower guide plates 54 and 56 create an upper and lower channels 58 and 60 between the outer edges of the guide plates 54 and 56 and the surface of the interior chamber 30 in which edges of the flow control gate 18 can be retained. The guide plates 54 and 56, in forming the upper and lower channels 58 and 60, provide a running and retaining surface for the flow control gate 18. The guide plates 54 and 56 further include support apertures 55 and 57, respectively. The support apertures 55 and 57 are centrally disposed guides for the control shaft 28, which radially constrain the control shaft 28 while permitting axial and rotational freedom. The upper and lower guide plates 54 and 56 may be formed integrally with the upper and lower retaining plates 40 and 42, or alternatively, may be formed as separate components from the upper and lower retaining plates 40 and 42.

Figure 2:
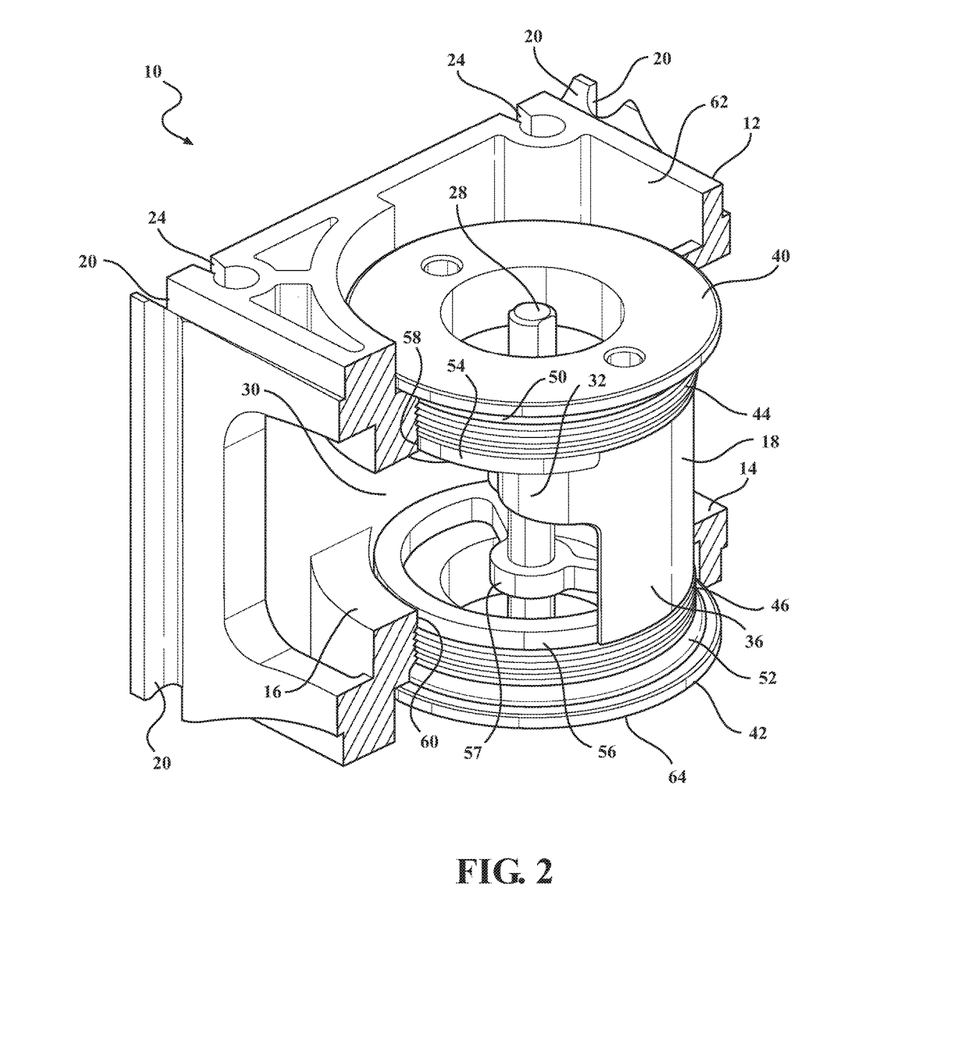
FIG. 2 shows the multifunction valve of FIG. 1 in partial cutaway view.

Referring now to FIG. 2, a second view of the multifunction valve 10 is shown in partial cutaway. In the orientation shown in FIG. 2, the inlet 14 of the valve body 12 is oriented into the plane of the page, with the outlet 16 oriented out of the plane of the page. In operation, the multifunction valve 10 is connected in series to a fluid circuit at the inlet 14 and the outlet 16. The fluid flowing through the multifunction valve 10 travels from the inlet 14 and is directed into an upper inlet branch 62 and a lower inlet branch 64. The fluid then flows into the interior chamber 30 through the upper and lower retaining plates 40 and 42 and past the upper and lower guide plates 54 and 56 in to the interior chamber 30. Finally, the fluid flows through the outlet 16 and exits the multifunction valve 10.

As described above, the flow control gate 18 is supported on the control shaft 28 in the interior chamber 30 to modulate the flow rate through the outlet 16 of the valve body 12. The control shaft 28 is further configured to be coupled to a force controller (not shown). The force controller may include, for example, a motor, such as a stepper motor. The control shaft 28 may extend out from the valve body 12 through the aperture 26 of the cover plate 22 to engage with the force controller. In an alternative embodiment, the force controller may mount to the cover plate 22 and include a linkage extending through the cover plate 22 to engage with the control shaft 28. In a further alternative embodiment, the cover plate 22 may be integrated as a component of the force controller, such as a motor housing. In such case, the force controller secures directly to the valve body 12, forming a fluid tight seal and engaging the control shaft 28.

The force controller operates to rotate the control shaft 28 and thereby position the flow control gate 18 within the inner chamber 30. Through a portion of the range of rotation, the flow control gate 18 does not cover any portion of the outlet 16, such as is shown in FIGS. 1 and 2. In this configuration the fluid flow through the multifunction valve is at a maximum, unrestricted flow rate. In another configuration where the force controller has operated to position the flow control gate 18 such that the full occlusion section 36 is adjacent to the outlet 16, the outlet 16 is fully covered and no fluid may flow through the multifunction valve 10. In a further configuration, the force controller has operated to rotate the flow control gate 18 such that a portion of the partial occlusion section 38 is adjacent to the outlet 16. In such manner, the fluid flow rate through the multifunction valve 10 can be finely modulated with high precision. The high level of precision control is achieved by selectively rotating the flow control 18 to occlude the desired portion of the outlet 16.

In the exemplary embodiment, the flow control gate 18 includes a constant linear slope through the partial occlusion section 38. This embodiment is shown in its flattened from in FIG. 3A, that is, before it has been curved to be assembled into the valve body 12. As the flow control gate 18 is rotated through the range where the partial occlusion section 38 is adjacent to the outlet 16, the flow rate is modulated in a linear fashion. The edge profile of the partial occlusion section determines profile of modulation. As the partial occlusion section being to cover the outlet 16, the flow rate would begin to decrease. As the flow control gate is positioned to increasingly cover the outlet 16, the flow rate would incrementally decrease proportionately.

Figure 3B:
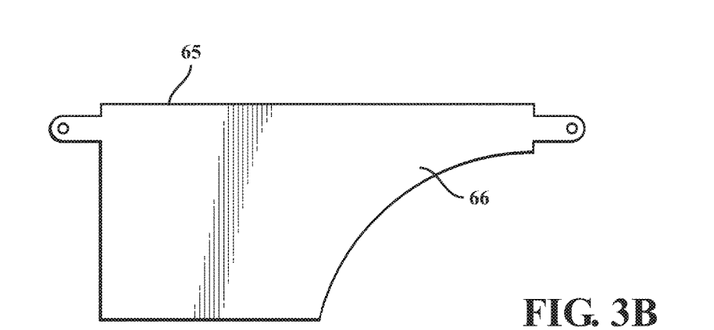
Figure 3C:
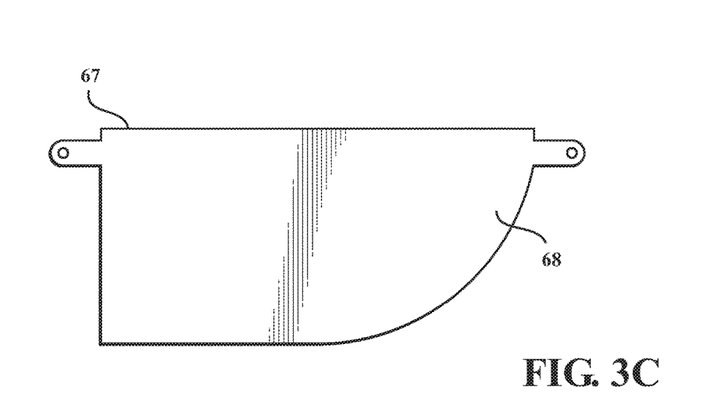

Alternative embodiments of the flow control gate 18 are depicted in FIGS. 3B- and 3C. In a first alternative embodiment as shown in FIG. 3B, a flow control gate 65 is shown having a nonlinear slope through the partial occlusion section 66. This nonlinear slope defines an edge profile that may provide a higher level of precision control through a mid-range of flow rates with less precision control at higher-end or lower-end flow rates. In a second alternative embodiment as shown in FIG. 3C, a flow control gate 67 is shown having a nonlinear slope through the partial occlusion section 68 different from that of the first alternative embodiment. In this embodiment, the flow control gate 67 may provide a higher level of precision control at lower-end flow rates.

Further alternative embodiments, not shown, may provide higher levels of increased precision control within specific ranges by tuning the edge profile of the partial occlusion section of the flow control gate. The tuning of the edge profile follows from the principle that a smaller increment of change in the occlusion or coverage of the outlet per an amount of rotation of the flow control gate results in more precise control. That is, for particular example, when using a stepper motor that provides a finite number of discrete steps per revolution, providing a shallower slope in the partial occlusion section of the flow control gate adjacent to the outlet at that step results in a smaller proportional change in occlusion when compared with a steeper slope. Therefore, the higher level of precision in a particular range of flow rates results from the shallower slope of the partial occlusion section.

Figure 4:
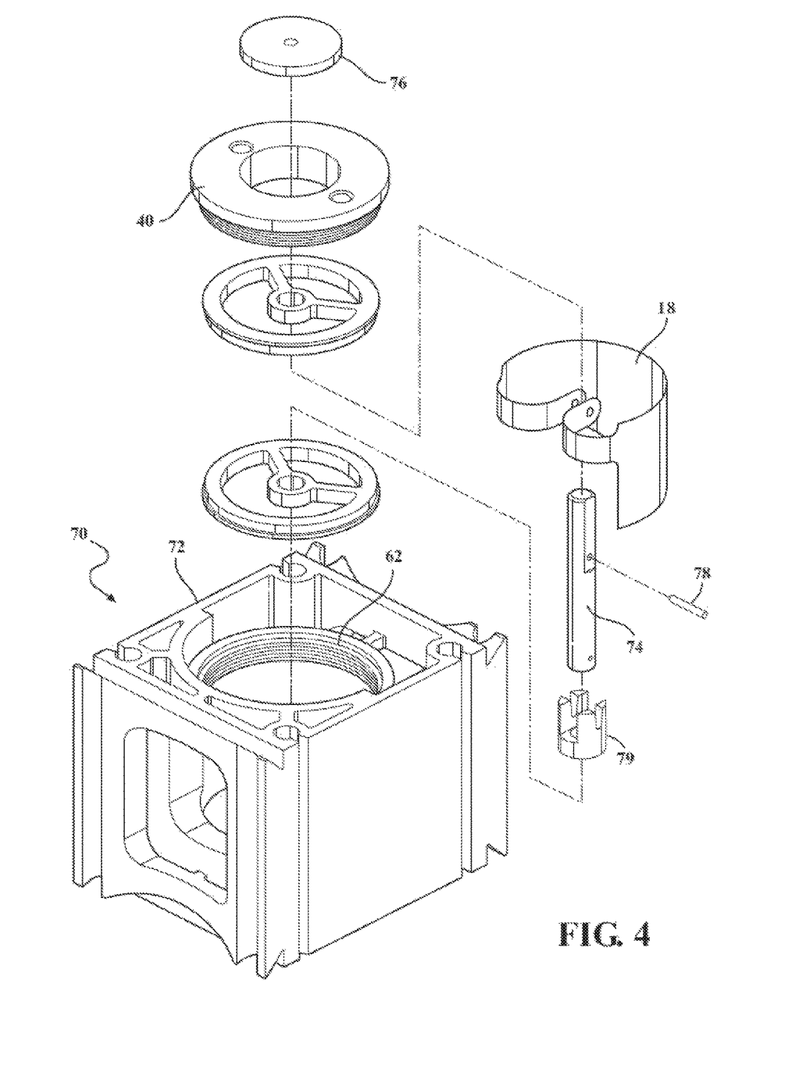
FIG. 4 shows an alternative embodiment of a multifunction valve according to another aspect of the present disclosure.

In further alternative embodiments of the present disclosure, multiple force controllers may be provided in engagement with the control shaft 28. In one such alternative embodiment as shown in FIG. 4, a multifunction valve 70 includes a valve body 72 generally similar to the valve body 12, but formed to include only one inlet branch, for example, an upper inlet branch 62. In this embodiment, a control shaft 74 extends from the valve body 72. A first force controller (not shown) engages the control shaft 74 to provide rotational motion to a flow control gate 18. An additional force controller (not shown) may be provided which provides translational motion to the control shaft 74 along its longitudinal axis. A sealing disk 76 may be further provided within the valve body 12 supported on the control shaft 74 and disposed between an upper retaining plate 40 and a cover plate 22 enclosing the upper inlet branch. The second force controller may impart axial displacement to the control shaft 74 urging the sealing disk 76 against the annular upper retaining plate 40 to close the fluid flow pathway through the upper retaining plate 40. The sealing disk 76 may be formed of a resilient material suitable for forming a seal against the upper retaining plate. In this way, the multifunction valve 70 may be provided with a secondary closing mechanism in addition to the full occlusion section 36 of the flow control gate 18 to prevent fluid flow. It is readily apparent that a single force controller capable of imparting both rotational and axial movement may be used with the multifunction valve 70, in addition to conventional mechanical linkages disposed between the force controller and the multifunction valve 70. In an embodiment where the control shaft translates along its axis, a spring, such as a helical spring 29, may be provided disposed between the control shaft and the guide plate, for example, to return the control shaft to its original position once a sealing force is removed. In alternative embodiments, the spring may be omitted and the control shaft may be returned to its original position by the resiliency of the flow control gate 18, and more specifically by the resiliency of the tabs extending as end sections of the flow control gate 18.

Figure 5:
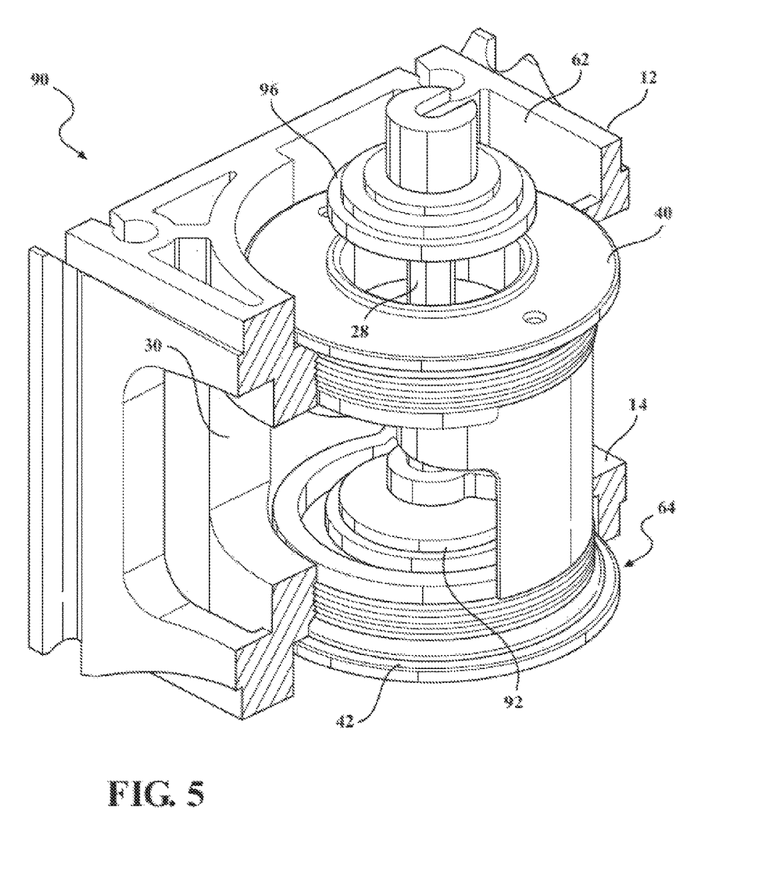
FIG. 5 shows a second alternative embodiment of a multifunction valve according to another aspect of the present disclosure.

A further alternative embodiment of a multifunction valve 90 according to the present disclosure is shown in FIG. 5. The multifunction valve 90 includes the valve body 12 having the inlet 14, and including upper and lower inlet branches 62 and 64. Similar to the earlier described embodiment, a sealing disk 96 is supported on the control shaft 28 between the upper retaining plate 40 and a cover plate 22 (not shown). In this embodiment, a second sealing disk 92 is supported on the control shaft 28 in the interior chamber 30. In this way, the control shaft can be positioned such that the sealing disk 96 and the second sealing disk 92 can be simultaneously urged against both the upper and lower retaining plates 40 and 42 as the sealing disks 96 and 92 move with the control shaft 28. This seals the interior chamber 30 against both the upper and lower inlet branches 62 and 64. Providing upper and lower inlet branches assists in maintaining a high capacity through the multifunction valve 90 and minimizes the introduction of further pressure drops as a fluid flows through the multifunction valve 90.

Figure 6:
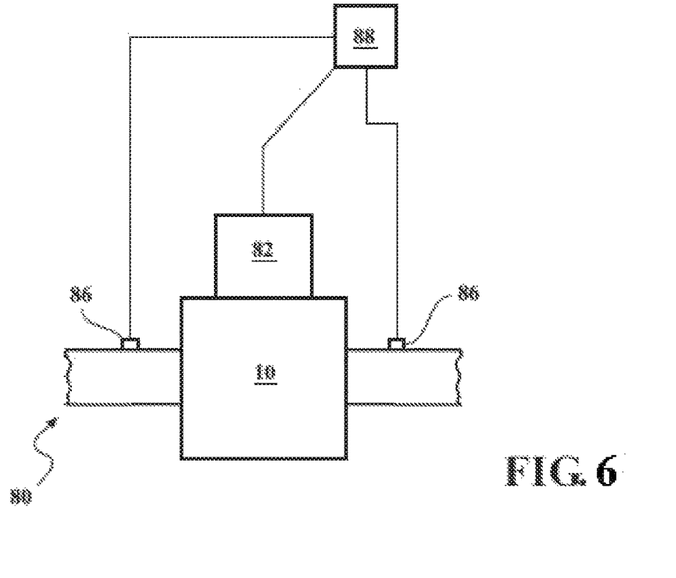
FIG. 6 shows a representative schematic of a portion of a fluid circuit according to an aspect of the present disclosure.

FIG. 6 depicts a schematic representation of a portion of a fluid circuit 80 including a multifunction valve 10. A force controller 82, for example a motor, solenoid, or combination thereof, is coupled to the multifunction valve 12 for actuating the multifunction valve 10 to control the fluid flow rate through the fluid circuit 80. One or more sensors 84 and 86 may be provided in the fluid circuit upstream and/or downstream of the multifunction valve 10. Such sensors may be selected to measure a characteristic of the fluid flow, such as flow rate, temperate, pressure, viscosity or other physical attribute. Alternatively, a secondary characteristic, or effect, resulting from the fluid flow may be measured. For example, measuring a temperature rise in a combustion process chamber (not shown) may be directly related to how much fluid (e.g., fuel) has passed through the multifunction valve. The sensors 84 and 86, or sensors associated with combustion process chamber (if present), or other components in a fluid circuit, may be in electronic communication with a system controller 88. The system controller 88 may include a computing device, programmable logic controller, or other system controller capable of receiving sensor signals from the sensors 84 and/or 86, and providing actuation control to the force controller 82.

The system controller 88 is in electronic communication with the force controller 82. The system controller 88 includes control instructions or programming that can generate instructions to direct the force controller 82 to operate the multifunction valve 10 to change the fluid flow rate by rotating the flow control gate 18 or by translating the sealing disk or disks into engagement. In some embodiments, the system controller 88 is configured to control the fluid flow rate in response to a signal from one or more sensors that an attribute of the fluid flow has deviated from a set point or set range. In alternative embodiments, the system controller may be configured to control the flow rate independent of any sensor signal, for example, according to a predetermined sequence of flow rate modulation over time. In some embodiments, the system controller 88 may be integrated with the force controller 82 as a single controller. In other embodiments, the system controller 88 and force controller 82 are separate components in electronic communication. Electronic communication between the system controller 88 and the force controller 82, or between the sensors 84 and 86, if present, and the system controller 88 may be achieved through wired communication, wireless communication, or a combination of wired and wireless communication, and including through one or more intermediary devices (not shown).

Figure 7:
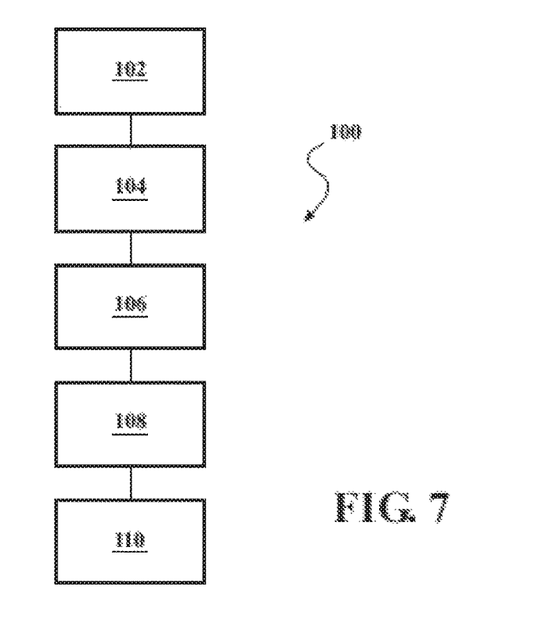
FIG. 7 shows a flow chart illustrating steps of a process of flow control.

A method 100 of modulating a fluid flow rate is depicted in FIG. 7. The method includes a first step 102 of sensing, at a sensor, an attribute of fluid flow through a fluid circuit. The sensor generates a sensor signal which is communicated to a system controller as the second step 104. The system controller executes a control operation at step 106, which is responsive to the sensor signal. The execution of the control operation generates a control signal based on previously programmed operation parameters responsive to the sensor signal at step 108 that is communicated to the force controller. Finally at step 110, the force controller actuates in response to the control signal to adjust a flow control gate position within the multifunction valve in the fluid circuit to modulate the fluid flow rate through the fluid circuit.

Alternative methods of modulating a flow rate may exclude the sensor and sensor signal, the system controller instead generating control signals based on predefined programming or instructions. In a further alternative embodiment, the system controller and the force controller are integrated as a single unit such that the sensors may communicate directly to the force controller which can respond by directly actuating the force controller to modulate the fluid flow rate. Further alternative methods of control will be readily appreciated considering the multiple embodiments described above.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A multifunction valve comprising:
 a valve body defining an inlet in fluid communication with an outlet, the valve body further defining an interior chamber disposed in a fluid flow pathway between the inlet and the outlet;
 a control shaft disposed within the interior chamber and coupled to the valve body for rotational movement relative thereto;
 a flow control gate disposed within the internal chamber and coupled to the control shaft for movement therewith;
 a first retaining plate and a second retaining plate disposed within the valve body, the first retaining plate and the second retaining plate positioned adjacent to opposing sides of the flow control gate;
 a first guide plate disposed adjacent to the first retaining plate and a second guide plate disposed adjacent to the second retaining plate;
 wherein the first guide plate forms a first channel between an outer edge of the first guide plate and a first surface of the interior chamber and the second guide plate forms a second channel between an outer edge of the second guide plate and a second surface of the interior chamber in which the flow control gate is retained as it traverses rotatably through the arcuate range of positions relative to the outlet of the valve body; and
 wherein the flow control gate includes a full occlusion section and a partial occlusion section, the flow control gate rotatably adjustable through an arcuate range of positions relative to the outlet of the valve body such that when the full occlusion section is adjacent to the outlet fluid flow through the valve body is prevented and when the partial occlusion section is adjacent to the outlet fluid flow through the valve body is diminished proportionately to the occlusion of the outlet by the flow control gate.

2. The multifunction valve according to claim 1, wherein the inlet and the outlet are positioned on opposing sides of the valve body; and
   wherein the flow control gate is disposed between the inlet and the outlet.

3. The multifunction valve according to claim 2, wherein the first retaining plate and the second retaining plate are secured to the valve body at respective threaded interfaces.

4. The multifunction valve according to claim 1, wherein the first retaining plate and the second retaining plate secure the flow control gate within the interior chamber and against axial displacement relative to the valve body.

5. The multifunction valve according to claim 1, further comprising a gasket at a respective interface between the first retaining plate and the second retaining plate to the valve body.

6. The multifunction valve of claim 1, wherein the partial occlusion section of the flow control gate comprises a linear edge profile.

7. The multifunction valve of claim 1, wherein the partial occlusion section of the flow control gate comprises a non-linear edge profile.

8. The multifunction valve of claim 1, further comprising a pin securing the flow control gate to the control shaft.

9. A multifunction valve comprising:
   a valve body defining an inlet in fluid communication with an outlet, the valve body further defining an interior chamber disposed in a fluid flow pathway between the inlet and the outlet;
   a control shaft disposed within the interior chamber and coupled to the valve body for rotational and axial-translational movement relative thereto;
   a flow control gate disposed within the internal chamber and coupled to the control shaft for movement therewith;
   a first retaining plate and a second retaining plate disposed within the valve body, the first retaining plate and the second retaining plate positioned adjacent to opposing sides of the flow control gate;
   a first guide plate disposed adjacent to the first retaining plate and a second guide plate disposed adjacent to the second retaining plate;
   wherein the first guide plate forms a first channel between an outer edge of the first guide plate and a first surface of the interior chamber and the second guide plate forms a second channel between an outer edge of the second guide plate and a second surface of the interior chamber in which the flow control gate is retained as it traverses rotatably through the arcuate range of positions relative to the outlet of the valve body; and
   wherein the flow control gate includes a full occlusion section and a partial occlusion section, the flow control gate rotatably adjustable through an arcuate range of positions relative to the outlet of the valve body such that when the full occlusion section is adjacent to the outlet fluid flow through the valve body is prevented and when the partial occlusion section is adjacent to the outlet fluid flow through the valve body is diminished proportionately to the occlusion of the outlet by the flow control gate.

10. The multifunction valve according to claim 9, wherein the inlet and the outlet are positioned on opposing sides of the valve body; and
    wherein the flow control gate is disposed between the inlet and the outlet.

11. The multifunction valve according to claim 10, wherein the first retaining plate and the second retaining plate secure the flow control gate within the interior chamber and against axial displacement relative to the valve body.

12. The multifunction valve according to claim 11, further comprising a gasket at a respective interface between the first retaining plate and the second retaining plate to the valve body.

13. The multifunction valve of claim 9, wherein the partial occlusion section of the flow control gate comprises a linear edge profile.

14. The multifunction valve of claim 9, wherein the partial occlusion section of the flow control gate comprises a non-linear edge profile.

15. The multifunction valve of claim 9,
    wherein the first guide plate comprises an opening for fluid communication between the inlet and the outlet, and wherein the second guide plate is a barrier against fluid flow, such that there is a single fluid flow pathway through the valve body.

16. The multifunction valve of claim 15 further comprising a sealing disk coupled to the control shaft and positionable adjacent to the first guide plate upon axial-translational movement of the control shaft relative to the valve body to seal the fluid flow pathway.

17. The multifunction valve of claim 9, wherein both the first and the second guide plates comprise openings for fluid communication between the inlet and the outlet through both of the first and the second guide plates;
    wherein the multifunction valve further comprises:
    a first sealing disk coupled to the control shaft and positionable adjacent to the first guide plate upon axial-translational movement of the control shaft relative to the valve body to seal the fluid flow pathway through the first guide plate; and
    a second sealing disk coupled to the control shaft and positionable adjacent to the second guide plate upon axial-translational movement of the control shaft relative to the valve body to seal the fluid flow pathway through the second guide plate.

18. A method of modulating a fluid flow rate, the method comprising:
    directing fluid flow through a multifunction valve from an inlet to an outlet, the multifunction valve comprising:
    a flow control gate including a full occlusion section and a partial occlusion section, the flow control gate supported on a control shaft in an interior chamber of a valve housing;
    a first retaining plate and a second retaining plate disposed within the valve housing adjacent to the flow control gate, the first retaining plate and the second retaining plate are positioned on opposing sides of the flow control gate; and
    wherein the first retaining plate and the second retaining plate are secured to the valve housing at respective threaded interfaces; and
    a first guide plate disposed adjacent to the first retaining plate and a second guide plate disposed adjacent to the second retaining plate;
    wherein the first guide plate forms a first channel between an outer edge of the first guide plate and a first surface of the interior chamber and the second guide plate forms a second channel between an outer edge of the second guide plate and a second surface of the interior chamber in which the flow control gate is retained as it traverses rotatably through the arcuate range of positions relative to the outlet of the valve body; and rotating the control shaft to position the flow control gate to variably occlude the outlet of the fluid control valve.

19. The method of modulating a fluid flow rate according to claim 18, further comprising the step of axially displacing the control shaft relative to the valve housing to position a sealing disk to seal the multifunction valve from fluid flow.

20. A multifunction valve comprising:
a valve body defining an inlet in fluid communication with an outlet, the valve body further defining an interior chamber disposed in a fluid flow pathway between the inlet and the outlet;
a control shaft disposed within the interior chamber and coupled to the valve body for rotational and axial-translational movement relative thereto;
a flow control gate disposed within the internal chamber and coupled to the control shaft for movement therewith;
a first retaining plate and a second retaining plate disposed within the valve body;
wherein the first retaining plate and the second retaining plate are positioned adjacent to opposing sides of the flow control gate;
a first guide plate disposed adjacent to the first retaining plate and a second guide plate disposed adjacent to the second retaining plate, wherein both the first and the second guide plates comprise openings for fluid communication between the inlet and the outlet through both of the first and the second guide plates;
a first sealing disk coupled to the control shaft and positionable adjacent to the first guide plate upon axial-translational movement of the control shaft relative to the valve body to seal the fluid flow pathway through the first guide plate; and
a second sealing disk coupled to the control shaft and positionable adjacent to the second guide plate upon axial-translational movement of the control shaft relative to the valve body to seal the fluid flow pathway through the second guide plate;
wherein the flow control gate includes a full occlusion section and a partial occlusion section, the flow control gate rotatably adjustable through an arcuate range of positions relative to the outlet of the valve body such that when the full occlusion section is adjacent to the outlet fluid flow through the valve body is prevented and when the partial occlusion section is adjacent to the outlet fluid flow through the valve body is diminished proportionately to the occlusion of the outlet by the flow control gate;
wherein the first retaining plate and the second retaining plate secure the flow control gate within the interior chamber and against axial displacement relative to the valve body.

* * * * *